(12) United States Patent
Koran

(10) Patent No.: US 8,712,844 B2
(45) Date of Patent: Apr. 29, 2014

(54) USE OF NATURAL QUERY EVENTS TO IMPROVE ONLINE ADVERTISING CAMPAIGNS

(75) Inventor: Joshua M. Koran, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1224 days.

(21) Appl. No.: 11/801,024

(22) Filed: May 8, 2007

(65) Prior Publication Data

US 2008/0281700 A1 Nov. 13, 2008

(51) Int. Cl.
G06Q 30/00 (2012.01)
G06F 17/30 (2006.01)
G06F 17/00 (2006.01)

(52) U.S. Cl.
USPC .................. 705/14.49; 705/14.53; 705/14.66

(58) Field of Classification Search
CPC ...................................... G06Q 30/02
USPC ......... 705/14, 10, 14.49, 14.53, 14.66; 707/4, 707/3, 5
See application file for complete search history.

(56) References Cited

U.S. PATENT DOCUMENTS

| | | | |
|---|---|---|---|
| 5,937,392 A * | 8/1999 | Alberts | 705/14.52 |
| 5,974,396 A * | 10/1999 | Anderson et al. | 705/7.33 |
| 6,173,279 B1 * | 1/2001 | Levin et al. | 704/9 |
| 6,763,353 B2 * | 7/2004 | Li et al. | 1/1 |
| 7,069,231 B1 * | 6/2006 | Cinarkaya et al. | 705/10 |
| 7,240,052 B2 * | 7/2007 | Sidlosky et al. | 1/1 |
| 2005/0131757 A1 * | 6/2005 | Chan et al. | 705/14 |
| 2006/0149625 A1 * | 7/2006 | Koningstein | 705/14 |
| 2007/0112746 A1 * | 5/2007 | Todhunter | 707/4 |
| 2008/0046312 A1 * | 2/2008 | Shany et al. | 705/14 |

* cited by examiner

Primary Examiner — John G Weiss
Assistant Examiner — Marilyn G Macasiano
(74) Attorney, Agent, or Firm — James J. DeCarlo; Greenberg Traurig, LLP

(57) ABSTRACT

A system and method to identify targeting criteria for online advertising campaigns based on natural query event data are described. A request to determine targeting criteria is received from an advertiser entity. Natural or algorithmic query event data related to the advertiser entity is retrieved from a data storage module. Attribute data associated with targeted customers is extracted based on the retrieved natural query event data. Finally, the attribute data is further processed to determine a set of criteria to target advertisements to the customers.

27 Claims, 7 Drawing Sheets

USE OF NATURAL QUERY EVENTS TO IMPROVE ONLINE ADVERTISING CAMPAIGNS

TECHNICAL FIELD

The present invention relates generally to computer applications and, more particularly, to a system and method to identify targeting criteria for online advertising campaigns based on natural query event data.

BACKGROUND OF THE INVENTION

Marketing is the art of reaching the right customer or consumer, with the right message at the right time. Since marketers cannot afford to craft unique messages for each targeted individual, they always deal with large segments of their target market at any given time.

An efficient system of targeting advertisements can improve a marketer's return on the advertising budget. However, the learning curve in determining such targeting parameters for any given product or brand is expensive and time consuming. If the marketers have a history of targeting actions, they can analyze the previous results to determine which permutations of targeting criteria have worked in the past. Otherwise, the marketers may be unable to predict if the price premium is worth paying for a certain set of targeting criteria. Moreover, an exclusive focus on targeting criteria of past campaigns may lead to reinforcement of inefficient choices.

Thus, what is needed is a system and method to identify targeting criteria for online advertising campaigns based on natural query event data in order to improve the overall effectiveness of the advertisements.

SUMMARY OF THE INVENTION

A system and method to identify targeting criteria for online advertising campaigns based on natural query event data are described. A request to determine targeting criteria is received from an advertiser entity. Natural or algorithmic query event data related to the advertiser entity is retrieved from a data storage module. Attribute data associated with targeted customers is extracted based on the retrieved natural query event data. Finally, the attribute data is further processed to determine a set of criteria to target advertisements to the customers.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A system and method to identify targeting criteria for online advertising campaigns based on natural query event data are described.

Figure 1:
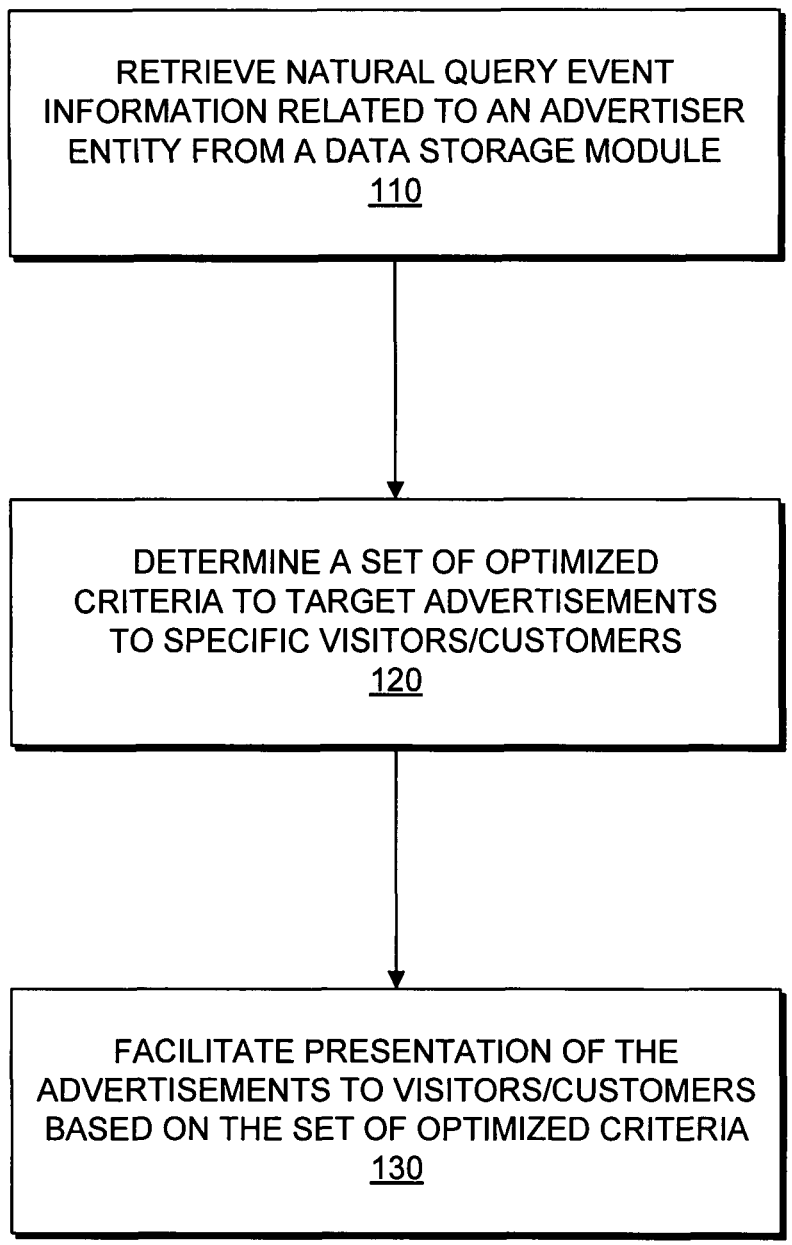
FIG. 1 is a flow diagram illustrating a processing sequence to facilitate identification of targeting criteria for online advertising campaigns based on natural query event data and presentation of advertisements to customers, according to one embodiment of the invention.

FIG. 1 is a flow diagram illustrating a processing sequence to facilitate identification of targeting criteria for online advertising campaigns based on natural query event data and presentation of advertisements to customers. As shown in FIG. 1, at processing block 110, the sequence starts with retrieval of natural query event information related to an advertiser entity within a specific industry. In one embodiment, the user or advertiser connects to an entity, which contains a system to identify targeting criteria and to present advertisements to visitors/customers of the entity, and transmits a request to determine targeting criteria, as described in further detail below. Alternatively, the advertiser may connect to the entity via a network to transmit the request to display the targeting criteria. In response to the request, the entity retrieves associated natural, also known as algorithmic, query event information from a corresponding data storage module, such as, for example, natural search queries performed by visitors/customers in a predetermined period of time.

Next, at processing block 120, a set of optimized criteria to target advertisements to specific visitors/customers is determined. In one embodiment, the entity receives the request and optimizes the retrieved natural query event information to determine one or more targeting criteria for subsequent presentation of advertisements, as described in further detail below.

Finally, at processing block 230, presentation of the advertisements to the visitors/customers is facilitated based on the set of optimized criteria. In one embodiment, the entity displays the set of optimized targeting criteria to the advertiser and the advertiser further instructs the entity to present predetermined advertisements to the visitors/customers with attributes matching the selected targeting criteria, as described in further detail below. Alternatively, the entity generates automatically a selection of advertisements based on the targeting criteria and presents the advertisements to the specific visitors/customers, as described in detail below.

Figure 2:
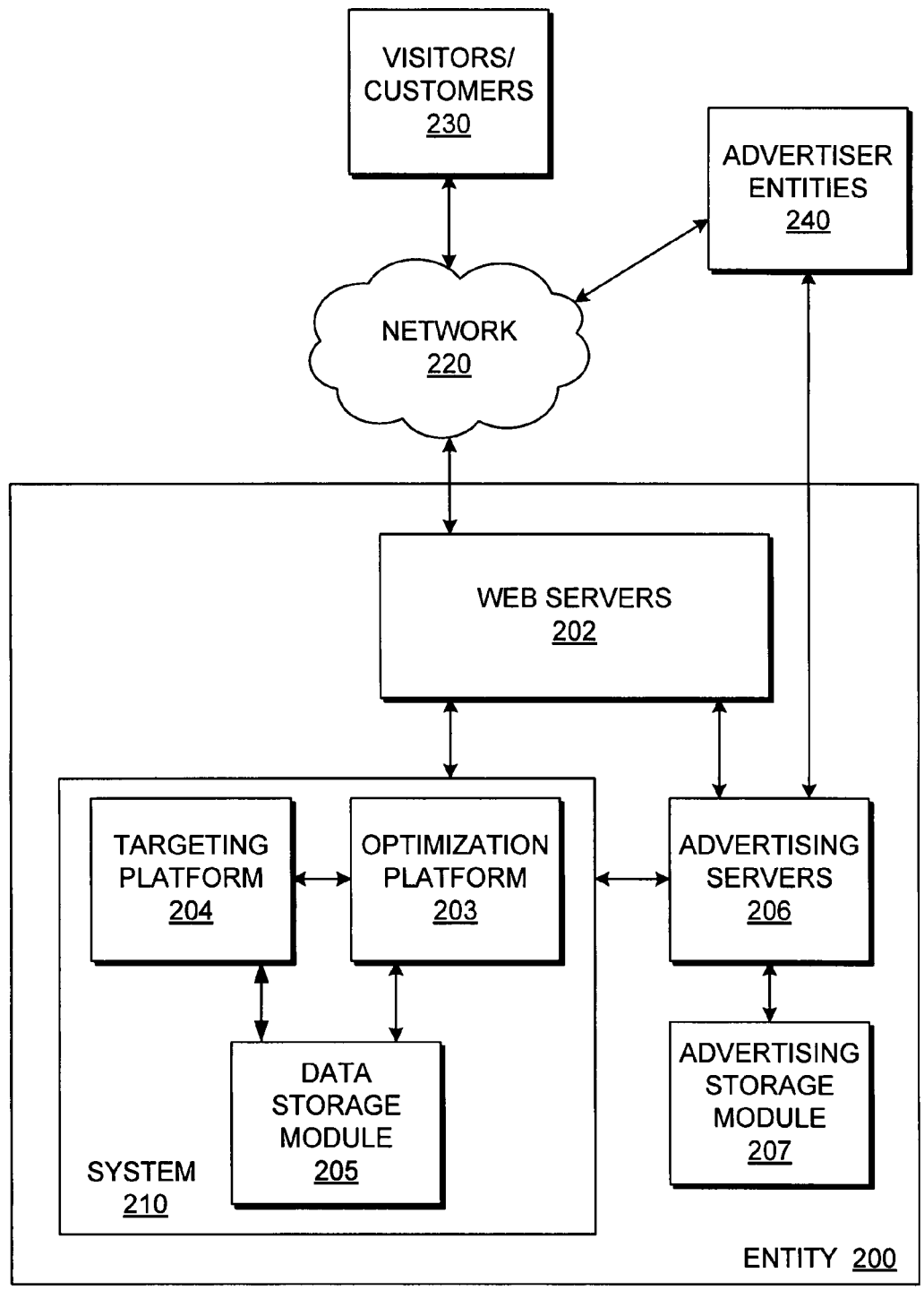
FIG. 2 is a block diagram illustrating an exemplary entity containing a system to facilitate identification of targeting criteria for online advertising campaigns based on natural query event data and presentation of advertisements to customers, according to one embodiment of the invention.

FIG. 2 is a block diagram illustrating an exemplary entity containing a system to facilitate identification of targeting criteria for online advertising campaigns based on natural query event data and presentation of advertisements to customers. While an exemplary embodiment of the present invention is described within the context of an entity 200 enabling such identification and presentation operations, it will be appreciated by those skilled in the art that the invention will find application in many different types of computer-based, and network-based, entities.

In one embodiment, the entity 200, such as, for example, an Internet portal, includes one or more front-end web servers 202, which may, for example, deliver web pages to multiple visitors or customers 230, (e.g., markup language documents), handle search requests or queries to the entity 200, provide automated communications to/from visitors/customers 230 of the entity 200, deliver images to be displayed within the web pages, deliver content information to the visitors/customers 230, and other interface operations in connection with the visitors/customers 230. In one embodiment, the front-end web servers 202 are further configured to provide interface capabilities to one or more users 240, such as, for example, advertiser entities, marketers, or other users of applications residing within the entity 200, and to enable such users 240 to communicate with the entity 200, either directly or through a network 220. Alternatively, the entity 200 may include a number of additional front-end servers (not shown), which provide an intelligent interface to the back-end of the entity 200.

In one embodiment, the entity 200 further includes one or more back-end servers coupled to the front-end web servers 202, such as, for example, advertising servers 206, and other processing servers, such as, for example, database processing servers (not shown), and a system 210 to facilitate identification of targeting criteria for online advertising campaigns and presentation of advertisements, as described in further detail below, the system 210 being coupled to the front-end web servers 202 and the advertising servers 206. In one embodiment, the advertising servers 206 are further coupled to one or more advertising storage modules 207, which are configured to store advertisements for presentation to visitors/customers 230.

In one embodiment, the system 210 further includes an optimization platform 203 coupled to a data storage module 205 and a targeting platform 204. The optimization platform 203 may include software and/or hardware modules configured to perform identification and presentation operations, as described in further detail below. The targeting platform 204 may include software and/or hardware modules configured to perform automated targeting of advertisements, as described in detail below.

The data storage module 205, which at least partially implements and supports the system 210, may include one or more storage facilities, such as a database or collection of databases, which may be implemented as relational databases. Alternatively, the data storage module 205 may be implemented as a collection of objects in an object-oriented database, as a distributed database, or any other such databases. The data storage module 205 is accessible by the optimization platform 203 and stores natural query event data related to the advertiser entities 240 and attribute data related to the visitors/customers 230, as described in further detail below.

In one embodiment, the visitors/customers 230 and the users/advertisers 240 may access the entity 200 through respective client machines (not shown) coupled to the visitors/customers 230 and the users/advertisers 240 or, in the alternative, through respective client programs, such as a browser (e.g., the Internet Explorer browser distributed by Microsoft Corporation of Redmond, Wash.), that executes on each client machine and accesses the entity 200 via the network 220, such as, for example, the Internet. Other examples of networks that a client machine may utilize to access the entity 200 includes a wide area network (WAN), a local area network (LAN), a wireless network (e.g., a cellular network), the Plain Old Telephone Service (POTS) network, or other known networks.

Figure 3:
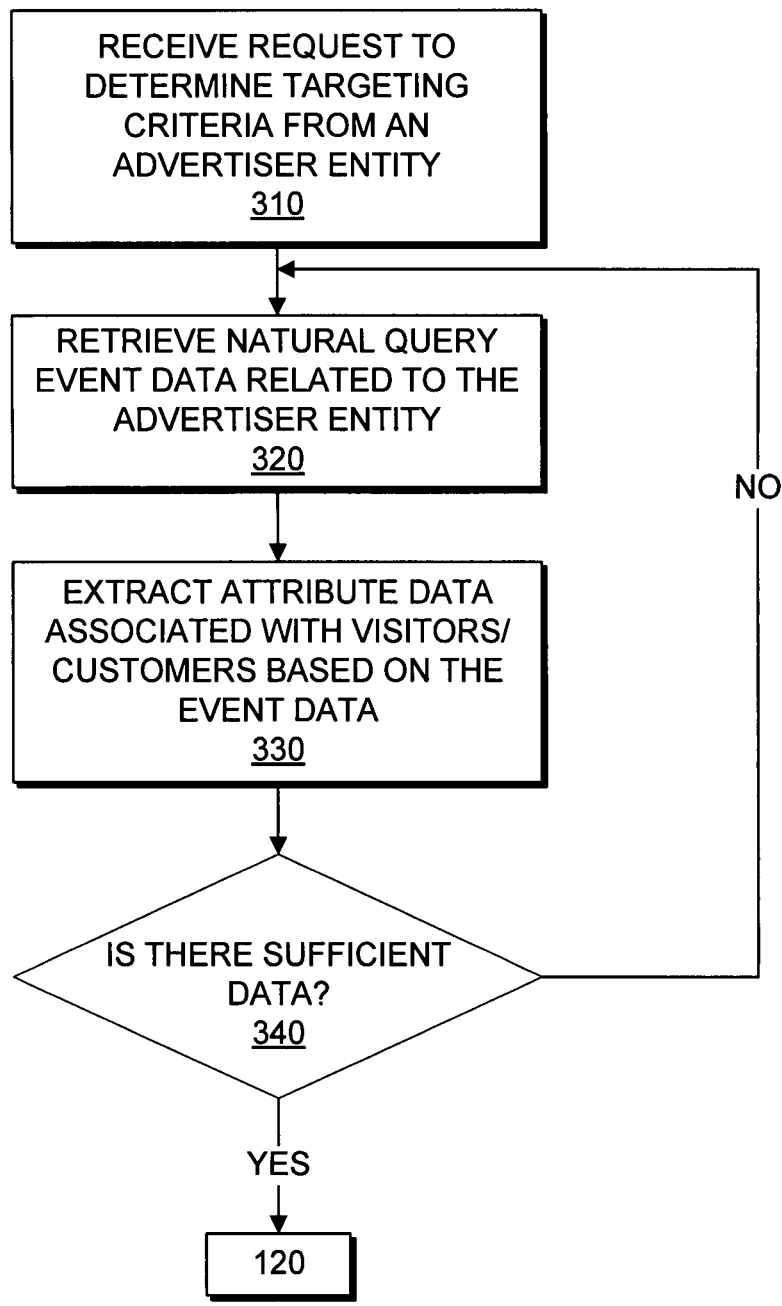
FIG. 3 is a flow diagram illustrating a method to identify attribute data related to customers, according to one embodiment of the invention.

FIG. 3 is a flow diagram illustrating a method to identify attribute data related to customers, according to one embodiment of the invention. As shown in FIG. 3, at processing block 310, a request to determine a set of criteria to target advertisements to specific customers is received. In one embodiment, a user, such as, for example, the advertiser entity 240, connects directly to the advertising servers 206 within the entity 200 and transmits a request to determine the targeting criteria and to receive recommendations of criteria necessary to accomplish specific advertising goals, such as, for example, acquisition, branding, direct response, retention, and/or monetization. Alternatively, the advertiser entity 240 may connect to the web servers 202 within the entity 200 via the network 220 to transmit the request to determine the targeting criteria.

At processing block 320, natural query event data related to the advertiser entity 240 is retrieved from the data storage module 205. In one embodiment, the optimization platform 203 within the system 210 accesses event logs (not shown) within the data storage module 205 to retrieve event information logged by the entity 200 in a predetermined period of time. In one example, such events include natural (algorithmic) search queries initiated by visitors/customers 230 for search keywords linked to multiple uniform resource locator (URL) links associated with the advertiser entity 240 and subsequent search clicks on the advertiser's URL links within the predetermined period of time, such as, for example, a month, week, or a 24-hour period. In one embodiment, the stored data includes a time stamp parameter indicating the time of the event, the advertiser's URL link, and a cookie or other identification parameter associated with each respective visitor/customer 230.

At processing block 330, attribute data associated with the visitors/customers 230 is extracted from the data storage module 205 based on the retrieved natural query event data. In one embodiment, the optimization platform 203 accesses respective storage facilities within the data storage module 205 to extract attribute data associated with each visitor/customer 230 based on the corresponding cookie or other identification parameter retrieved from the event logs. In one embodiment, attribute data may include, for example, demographic information, such as gender, age, occupation of targeted visitors/customers 230, technographic information, such as the equipment used, the type of client browser and operating system, Internet Protocol (IP) address and mapping to geographical information, context information, such as data obtained while visitors/customers 230 are present on a particular web site, inferred profile information, such as data obtained from a behavioral targeting system, which monitors and registers the activities and behavior of visitors/customers 230 while accessing various web sites, and timing information, such as the time of day or the day within a week when visitors/customers 230 respond favorably to targeted advertisements.

Finally, at processing block 340, a decision is made whether there are sufficient natural query event data and attribute data for further processing to identify targeting criteria for the advertiser entity 240. In one embodiment, the optimization platform 203 analyzes the retrieved event data and attribute data and counts the cookies or other known identification parameter linked to the visitors/customers 230 to determine if sufficient data is available for further processing. If there is sufficient data, then the procedure jumps to processing block 120 described in detail in connection with FIGS. 1 and 4. Otherwise, if more data needs to be extracted, processing blocks 320 and 330 are repeated and either more data is selected or the time period is adapted to include additional stored data.

Figure 4:
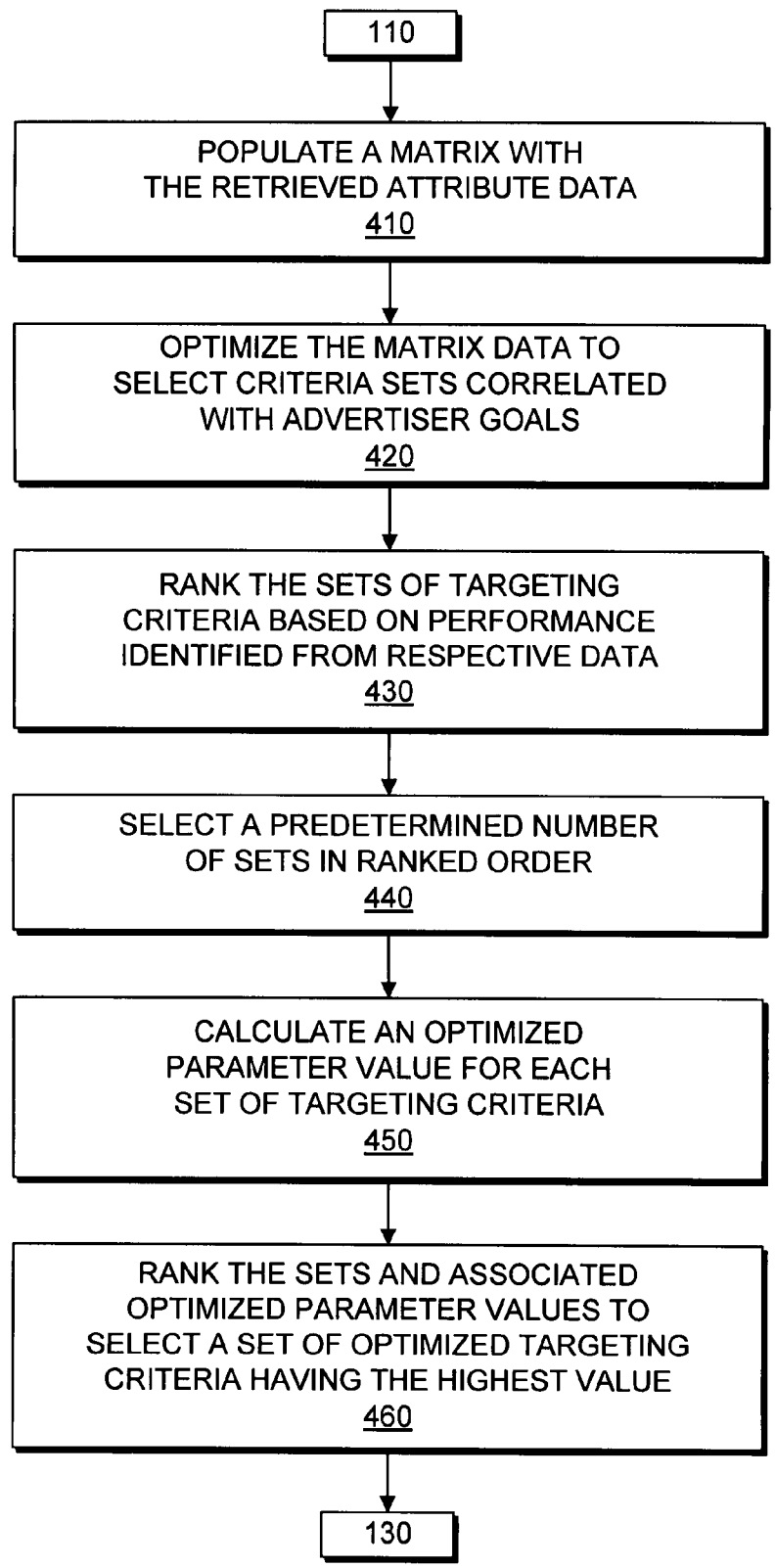
FIG. 4 is a flow diagram illustrating a method to select a set of optimized criteria to target advertisements to specific customers, according to one embodiment of the invention.

FIG. 4 is a flow diagram illustrating a method to select a set of optimized criteria to target advertisements to specific customers, as presented at processing block 120 of FIG. 1. It is to be understood, however, that other known methods to select optimized targeting criteria based on natural query event data and related customer attribute data may be used without departing from the scope of the present invention.

As shown in FIG. 4, at processing block 410, a matrix is populated with the retrieved advertiser targeting data and the respective competitor targeting data. In one embodiment, the optimization platform 203 within the entity 200 receives the retrieved attribute data and populates a matrix, such as, for example, a permutation matrix, which contains the user/advertiser information, the visitors/customers information and the corresponding attribute data.

At processing block 420, sets of targeting criteria highly correlated with the goals of the advertiser entity 240 are selected. In one embodiment, the optimization platform 203 applies one of many known optimization algorithms, such as, for example, a clustering algorithm or a segmentation algorithm, to optimize the matrix and to select the sets of targeting criteria. The targeting criteria may include, for example, demographic criteria, technographic criteria, geographical criteria, contextual criteria, customer profile criteria, and/or timing criteria, as described in further detail above. In an alternate embodiment, the optimization platform 203 selects the sets of targeting criteria from the entire body of data stored within the matrix.

In one embodiment, if the advertisements are sponsored listings, a matrix of keywords by all advertisers in a competitive set by click-through-rate parameter (CTR) is created. The CTR parameter may include clicks from natural search events, sponsored search events, or a combination of both. The keywords having a highest CTR value and/or a best cost-per-click (CPC)/CTR ratio (e.g., a high ratio like {$2 CPC/1% CTR} is worse than the lower ratio {$1 CPC/1% CTR}) are selected for further recommendation to the advertiser entity 240. Any keywords currently bid on by a specific advertiser entity 240 are marked, such that they can be filtered from any further recommendation.

In an alternate embodiment, if the advertisements are graphical ads part of a graphical ad campaign, the set of advertisements having a minimum number of clicks is used to identify direct-response campaigns. For these campaigns, a matrix of targeting data by all advertisers in a competitive set by the CTR parameter is created. The sets of targeting criteria having a highest CTR value and/or a CTR/CPM ratio are selected for further recommendation to the advertiser entity 240. Any targeting criteria currently purchased by the advertiser entity 240 are marked in order to be filtered from any further recommendation.

In one example, considering a product manufacturer X, such as, for example, an automobile manufacturer, the optimization platform 203 may reduce the dimensionality of the matrix by using the gender information, the age information, the geographical information, and the direct response information retrieved from a behavioral targeting system, all stored within the matrix to obtain a number of sets of targeting criteria, as follows:
   a. Female, 35-45 years old;
   b. Female, BTS/Direct Response, luxury autos;
   c. Female, 18-25 years old, living in the 90210 zip code;
etc.

At processing block 430, the sets of targeting criteria are ranked based on performance adapted to the goals of the user/advertiser 240. In one embodiment, the optimization platform 203 ranks the selected criteria sets based on historical performance when presented to targeted visitors/customers within the network 220.

At processing block 440, a predetermined number of criteria sets are selected. In one embodiment, the optimization platform 203 considers only a predetermined number of highly ranked sets for further processing. In an alternate embodiment, the optimization platform 203 may process all the ranked sets of targeting criteria. In the example detailed above, the optimization platform 203 ranks the sets of targeting criteria and selects the top three sets as follows:
   1. Female, 35-45 years old;
   2. Female, BTS/Direct Response, luxury autos;
   3. Female, 18-25 years old, living in the 90210 zip code.

At processing block 450, an optimized parameter value is calculated for each set of targeting criteria as a function of the associated performance and a cost parameter value. In one embodiment, the optimization platform 203 multiplies the performance parameters retrieved for each set of targeting criteria with a cost parameter value, which represents the amount of money necessary to target the respective set, for example, 35-45 year-old females. Each resulting optimized parameter value is further assigned to the corresponding set of targeting criteria.

At processing block 460, the criteria sets and their respective optimized parameter values are further ranked to select the optimized set of targeting criteria associated with the highest calculated optimized parameter value. In one embodiment, the optimization platform 203 subsequently ranks the sets based on their respective optimized parameter values and selects the optimized set of targeting criteria associated with the highest calculated optimized parameter value. The procedure then jumps to processing block 30 shown in connection with FIG. 2.

In the above example, if the cost parameters and the assigned optimized parameter values are calculated as follows, then the new ranking may be assembled as follows:
   1. Female, 35-45 years old, $10.00, optimized value "x";
   2. Female, 18-25 years old, living in the 90210 zip code, $5.00, "z";
   3. Female, BTS/Direct Response, luxury autos, $15.00, "y".

Therefore, the selected highest ranked optimized set of targeting criteria for the automobile manufacturer X is (Female, 35-45 years old).

Figure 5:
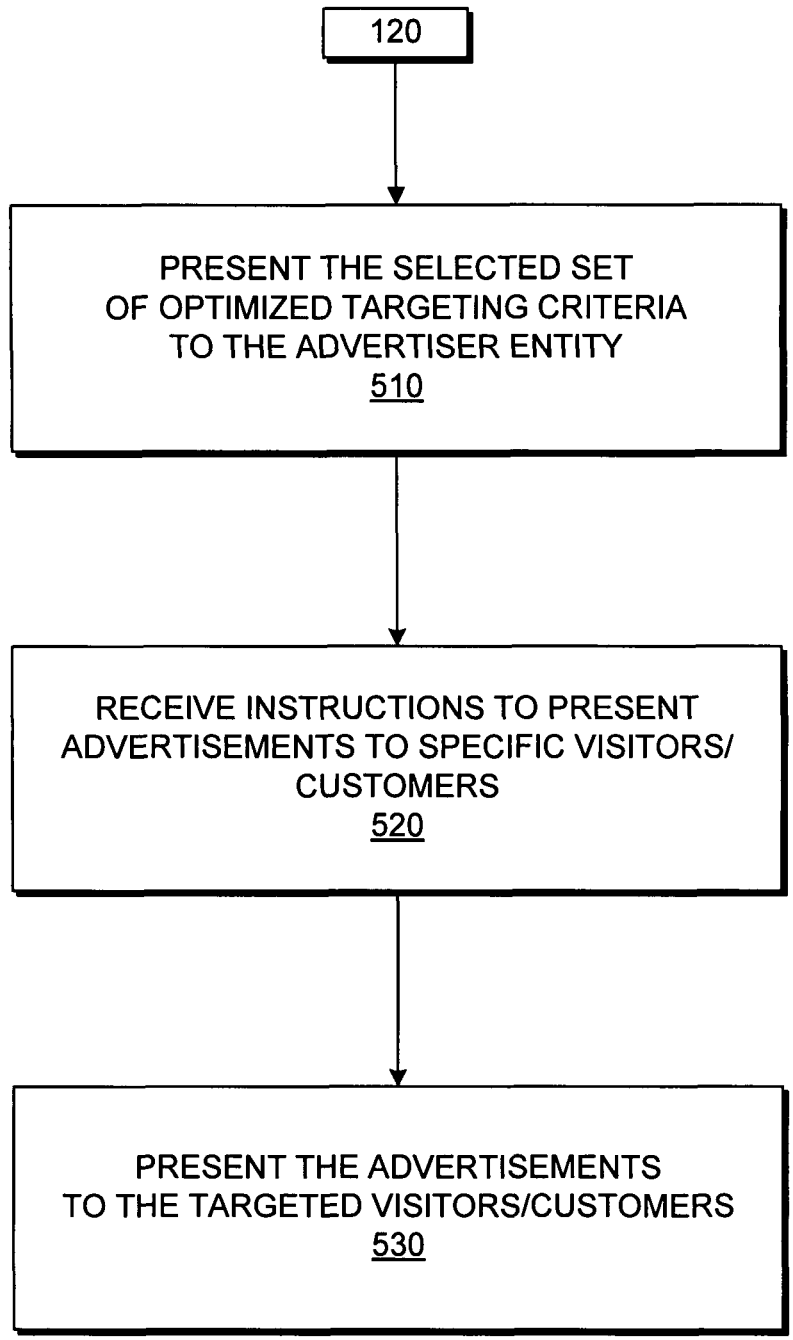
FIG. 5 is a flow diagram illustrating a method to facilitate presentation of advertisements to customers based on the selected optimized criteria, according to one embodiment of the invention.

FIG. 5 is a flow diagram illustrating one embodiment of a method to facilitate presentation of advertisements to customers based on the selected optimized criteria, as presented at processing block 130 of FIG. 2. At processing block 510, the selected set of optimized targeting criteria is presented to the advertiser entity 240. In one embodiment, the optimization platform 203 transmits the set of optimized targeting criteria to the advertiser entity 203 via the web servers 202 and the network 220, or, in the alternative, via the advertising servers 206. In another alternate embodiment, the optimization platform 203 may transmit all the ranked sets of targeting criteria to the advertiser entity 240 with specific recommendations as to the preferred optimized criteria set. The response rates for each set of targeting criteria may be also presented to the advertise entity 240 showing which areas the advertiser 240 is outperforming, matching, or underperforming the response rates of their competitors. The recommendations can thus be presented within a portfolio framework of targeting permutations, in addition of being listed in a ranked order.

At processing block 520, instructions to present advertisements to specific visitors/customers 230 are received from the advertiser entity 240. In one embodiment, the optimization platform 203 receives instructions from the advertiser entity 240 to present advertisements stored within the advertising storage module 207 to visitors/customers 230 which fit the set of optimized targeting criteria. Finally, at processing block 530, the optimization platform 203 presents the advertisements to the targeted visitors/customers 230 based on the received instructions, such as, for example, to females in the 35-45 year-old range.

Figure 6:
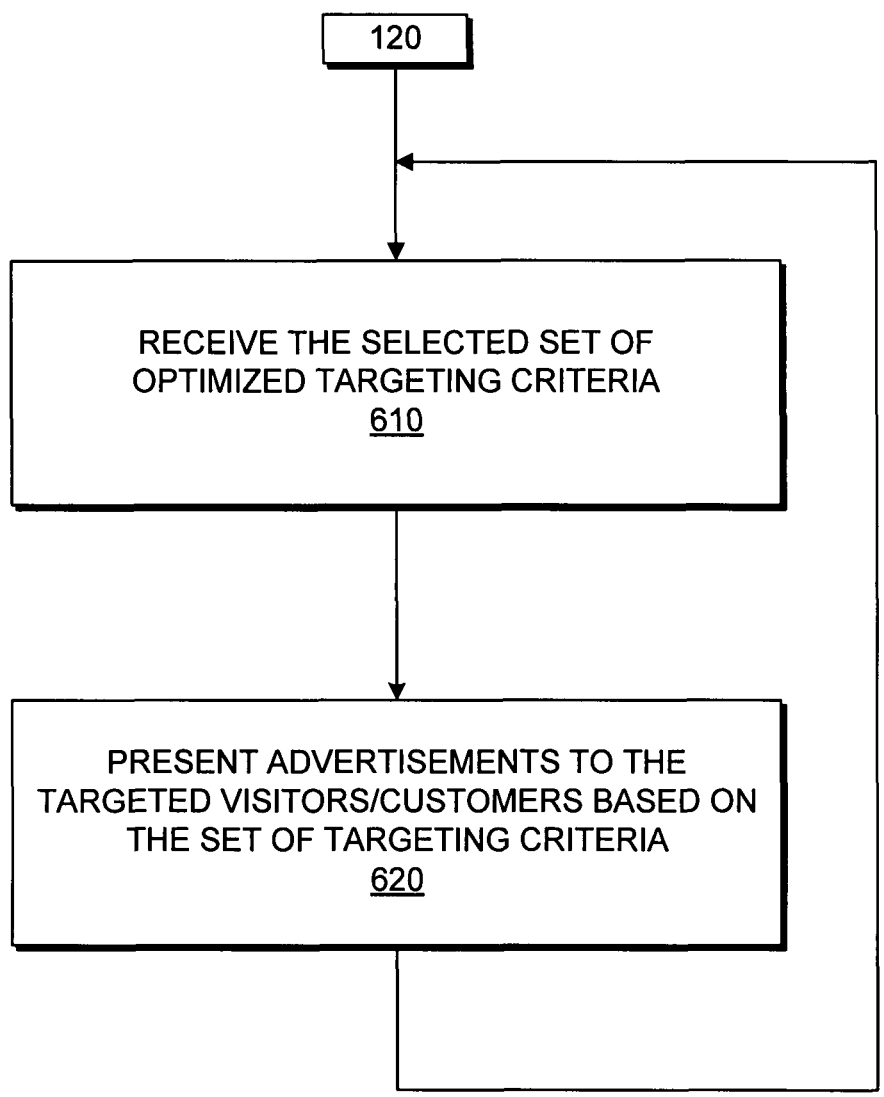
FIG. 6 is a flow diagram illustrating a method to facilitate automatic presentation of advertisements to customers based on the selected optimized criteria, according to one embodiment of the invention.

FIG. 6 is a flow diagram illustrating an alternate embodiment of a method to facilitate presentation of advertisements to customers based on the selected optimized criteria, as presented at processing block 130 of FIG. 2. At processing block 610, the selected set of optimized targeting criteria is presented to the targeting platform 204. In one embodiment, the optimization platform 203 transmits the set of optimized targeting criteria to the targeting platform 204 at predetermined periods of time.

At processing block 620, automatic presentation of advertisements is performed based on the set of optimized targeting criteria. In one embodiment, the targeting platform 204 receives the set of optimized targeting criteria and transmits advertisements stored within the advertising storage module 207 to visitors/customers 230, which fit the set of optimized targeting criteria. The procedure is subsequently repeated using a predetermined cycle time to update the set of optimized targeting criteria.

Figure 7:
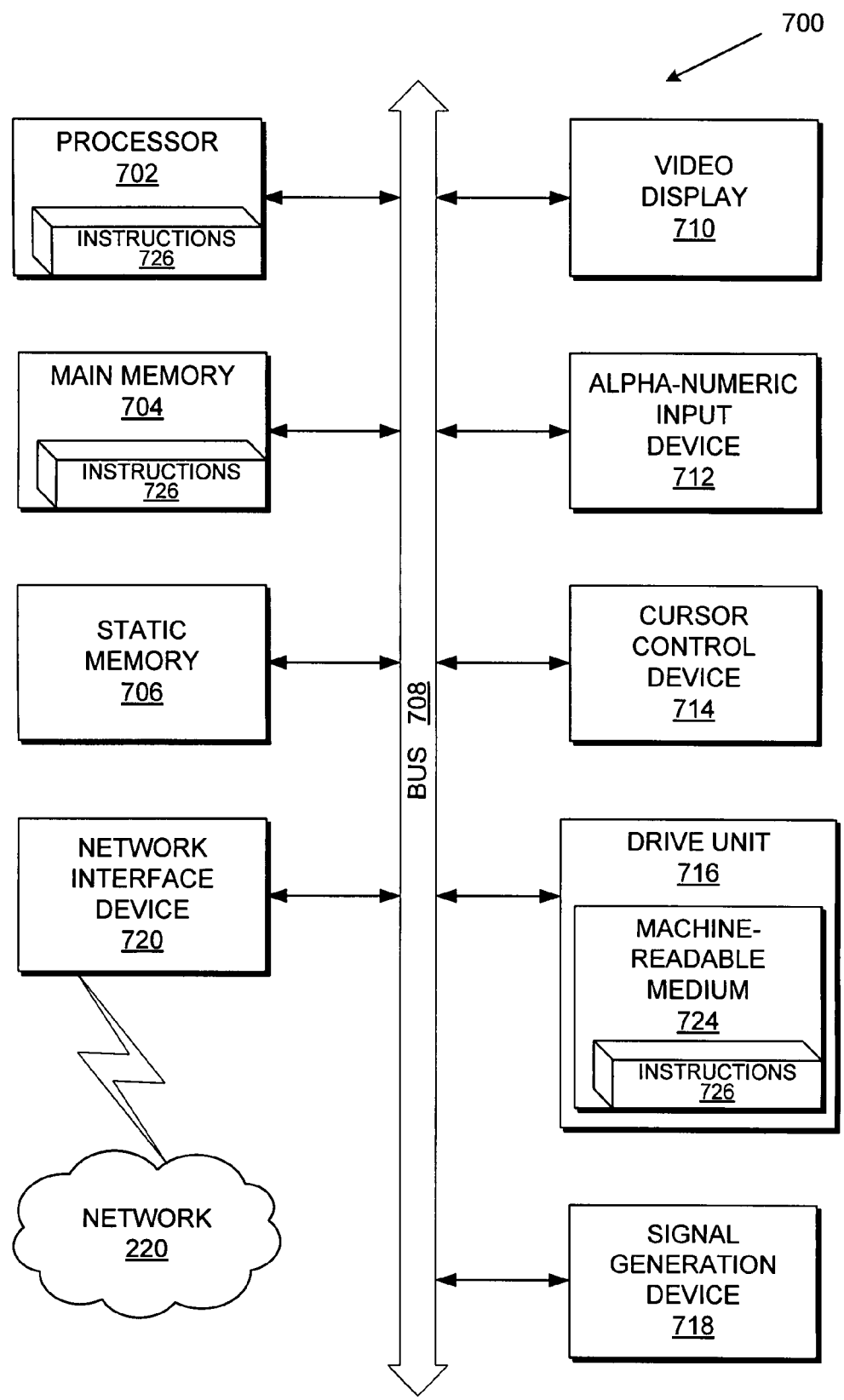
FIG. 7 is a diagrammatic representation of a machine in the exemplary form of a computer system within which a set of instructions may be executed.

FIG. 7 shows a diagrammatic representation of a machine in the exemplary form of a computer system 700 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker), and a network interface device 720.

The disk drive unit 716 includes a machine-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 720.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
   receiving in a data storage module of a portal entity customer natural query event data from a plurality of customers;
   retrieving, by a computer, natural query event data from the data storage module that is related to subject matter of interest to an advertiser entity;
   extracting, by a computer, attribute data from the data storage module associated with the customers based on the natural query event data, wherein the attribute data comprises attributes to identify customers;
   generating, by a computer, a matrix comprising attributes that identify customers related to the subject matter of interest for the advertiser;
   selecting a plurality of sets of advertising targeting criteria from the matrix, wherein an advertising targeting criteria set identifies a group of customers by at least one of the attributes;
   retrieving performance parameters for each set of advertising targeting criteria that identifies, for each set of advertising targeting criteria, a historical click-through rate for customers with attributes identified in the set of advertising targeting criteria; and
   selecting, by a computer, at least one set of advertising targeting criteria based on the performance parameters related to the subject matter of interest for the advertiser.

2. The method according to claim 1, further comprising:
   selecting a set of optimized advertising targeting criteria by:
      selecting a predetermined number of the top ranked sets of advertising targeting criteria,
      assigning an optimized parameter value to each set of the sets of advertising targeting criteria, and
      selecting the set of optimized advertising targeting criteria by using a highest optimized parameter value.

3. The method according to claim 1, further comprising:
   receiving in the portal entity a request for a set of optimized advertising targeting criteria from the advertiser entity, where retrieving the advertiser natural query event data is limited to customer natural query event that occurred in a predetermined period of time.

4. The method according to claim 3, where the natural query event data further comprises a plurality of natural search query events initiated by the customers in the predetermined period of time, each natural search query event further comprising search keywords linked to uniform resource locator (URL) links that are associated with the advertiser entity.

5. The method according to claim 4, where the natural query event data further comprises subsequent search click events on the URL links within the predetermined period of time.

6. The method according to claim 5, where each of the plurality of natural search query events and the subsequent search click events further comprise an identification parameter associated with a respective customer of the portal entity.

7. The method according to claim 6, where extracting attribute data is based on the identification parameter.

8. The method according to claim 6, further comprising: determining whether sufficient advertiser natural query event data is available by counting the identification parameters related to the corresponding natural search query events and search click events.

9. The method according to claim 1, further comprising: facilitating presentation of advertisements to customers of the portal entity as part of an online advertising campaign of the advertiser entity that is directed at the future customers of the portal entity, where facilitating presentation is based on the set of optimized advertising targeting criteria by transmitting the set of optimized advertising targeting criteria to the advertiser entity and, in response, receiving instructions from the advertiser entity to present advertisements to the future customers that fit the set of optimized advertising targeting criteria.

10. A computer readable medium containing executable instructions, which, when executed in a processing system, cause said processing system to perform a method comprising:
receiving in a data storage module of a portal entity customer natural query event data from a plurality of customers;
retrieving natural query event data from the data storage module that is related to subject matter of interest to an advertiser entity;
extracting attribute data from the data storage module associated with the customers based on the natural query event data, wherein the attribute data comprises attributes to identify customers;
generating a matrix comprising attribute that identify customers related to the subject matter of interest for the advertiser;
selecting a plurality of sets of advertising targeting criteria from the matrix, wherein an advertising targeting criteria set identifies a group of customers by at least one of the attributes;
retrieving performance parameters for each set of advertising targeting criteria that identifies, for each set of advertising targeting criteria, a historical click-through rate for customers with attributes identified in the set of advertising targeting criteria;
selecting at least one set of advertising targeting criteria based on the performance parameters related to the subject matter of interest for the advertiser.

11. The computer readable medium according to claim 10, further comprising:
selecting a set of optimized advertising targeting criteria by:
selecting a predetermined number of the top ranked sets of advertising targeting criteria,
assigning an optimized parameter value to each set of the sets of advertising targeting criteria, and
selecting the set of optimized advertising targeting criteria by using a highest optimized parameter value.

12. The computer readable medium according to claim 10, further comprising:
receiving in the portal entity a request for a set of optimized advertising targeting criteria from the advertiser entity, where retrieving the advertiser natural query event data is limited to customer natural query event that occurred in a predetermined period of time.

13. The computer readable medium according to claim 12, where the natural query event data further comprises a plurality of natural search query events initiated by the customers in the predetermined period of time, each natural search query event further comprising search keywords linked to uniform resource locator (URL) links that are associated with the advertiser entity.

14. The computer readable medium according to claim 13, where the natural query event data further comprises subsequent search click events on the URL links within the predetermined period of time.

15. The computer readable medium according to claim 14, where each of the plurality of natural search query events and the subsequent search click events further comprise an identification parameter associated with a respective customer of the portal entity.

16. The computer readable medium according to claim 15, where extracting attribute data is based on the identification parameter.

17. The computer readable medium according to claim 12, wherein said method further comprising:
determining whether sufficient advertiser natural query event data is available by counting the identification parameters related to the corresponding natural search query events and search click events.

18. The computer readable medium according to claim 10, further comprising:
facilitating presentation of advertisements to customers of the portal entity as part of an online advertising campaign of the advertiser entity that is directed at the future customers of the portal entity, where facilitating presentation is based on the set of optimized advertising targeting criteria by transmitting the set of optimized advertising targeting criteria to the advertiser entity and, in response, receiving instructions from the advertiser entity to present advertisements to the future customers that fit the set of optimized advertising targeting criteria.

19. A system, comprising:
A server, comprising a processor and memory, for:
receiving in a data storage module of a portal entity customer natural query event data from a plurality of customers;
retrieving natural query event data from the data storage module that is related to subject matter of interest to an advertiser entity;
extracting attribute data from the data storage module associated with the customers based on the natural query event data, wherein the attribute data comprises attributes to identify customers;
generating a matrix comprising attribute that identify customers related to the subject matter of interest for the advertiser;
selecting a plurality of sets of advertising targeting criteria from the matrix, wherein an advertising targeting criteria set identifies a group of customers by at least one of the attributes;
retrieving performance parameters for each set of advertising targeting criteria that identifies, for each set of advertising targeting criteria, a historical click-through rate for customers with attributes identified in the set of advertising targeting criteria;
selecting at least one set of advertising targeting criteria based on the performance parameters related to the subject matter of interest for the advertiser.

20. The system according to claim 19, further for:
selecting a set of optimized advertising targeting criteria by:
selecting a predetermined number of the top ranked sets of advertising targeting criteria, assigning an optimized parameter value to each set of the sets of advertising targeting criteria, and selecting the set of optimized advertising targeting criteria by using a highest optimized parameter value.

21. The system according to claim 19, further for:

receiving in the portal entity a request for a set of optimized advertising targeting criteria from the advertiser entity, where retrieving the advertiser natural query event data is limited to customer natural query event that occurred in a predetermined period of time.

22. The system according to claim 21, where the natural query event data further comprises a plurality of natural search query events initiated by the customers in the predetermined period of time, each natural search query event further comprising search keywords linked to uniform resource locator (URL) links that are associated with the advertiser entity.

23. The system according to claim 22, where the natural query event data further comprises subsequent search click events on the URL links within the predetermined period of time.

24. The system according to claim 23, where each of the plurality of natural search query events and the subsequent search click events further comprise an identification parameter associated with a respective customer of the portal entity.

25. The system according to claim 24, where extracting attribute data is based on the identification parameter.

26. The system according to claim 21, further comprising:

determining whether sufficient advertiser natural query event data is available by counting the identification parameters related to the corresponding natural search query events and search click events.

27. The system according to claim 19, further for:

facilitating presentation of advertisements to customers of the portal entity as part of an online advertising campaign of the advertiser entity that is directed at the future customers of the portal entity, where facilitating presentation is based on the set of optimized advertising targeting criteria by transmitting the set of optimized advertising targeting criteria to the advertiser entity and, in response, receiving instructions from the advertiser entity to present advertisements to the future customers that fit the set of optimized advertising targeting criteria.

\* \* \* \* \*